United States Patent [19]
Umehara

[11] Patent Number: 5,459,359
[45] Date of Patent: Oct. 17, 1995

[54] SWING-TYPE ACTUATOR

[75] Inventor: Teruo Umehara, Hanyu, Japan

[73] Assignee: Hitachi Metals, Ltd., Tokyo, Japan

[21] Appl. No.: 53,662

[22] Filed: Apr. 29, 1993

[30] Foreign Application Priority Data

| Apr. 30, 1992 | [JP] | Japan | 4-111240 |
| Apr. 30, 1992 | [JP] | Japan | 4-111241 |
| Apr. 30, 1992 | [JP] | Japan | 4-111242 |
| Jun. 25, 1992 | [JP] | Japan | 4-166528 |
| Jun. 25, 1992 | [JP] | Japan | 4-166529 |
| Jun. 25, 1992 | [JP] | Japan | 4-166530 |
| Jun. 25, 1992 | [JP] | Japan | 4-166531 |
| Jun. 30, 1992 | [JP] | Japan | 4-172283 |
| Jun. 30, 1992 | [JP] | Japan | 4-172284 |
| Feb. 9, 1993 | [JP] | Japan | 5-021034 |

[51] Int. Cl.⁶ .............................. H02K 41/02; G11B 5/54
[52] U.S. Cl. .............................. 310/13; 360/105; 360/106
[58] Field of Search ........................ 310/13, 43; 360/104, 360/105, 106, 122, 125

[56] References Cited

U.S. PATENT DOCUMENTS

| Re. 32,075 | 1/1986 | Harrison et al. | 360/77 |
| 4,150,407 | 4/1979 | Dijkstra | 360/106 |
| 4,196,456 | 4/1980 | Manzke et al. | 360/106 |
| 4,396,959 | 8/1983 | Harrison et al. | 360/177 |
| 4,490,635 | 12/1984 | Harrison et al. | 310/38 |
| 4,516,177 | 5/1985 | Moon et al. | 360/77 |

(List continued on next page.)

FOREIGN PATENT DOCUMENTS

| 2952095 | 7/1980 | Germany | 310/43 |
| 55-67975 | 5/1980 | Japan . | |
| 56-19561 | 2/1981 | Japan . | |
| 58-57721 | 4/1983 | Japan . | |
| 59-124066 | 7/1984 | Japan . | |
| 60-159566 | 8/1985 | Japan . | |
| 63-142574 | 6/1988 | Japan . | |
| 64-89946 | 4/1989 | Japan . | |
| 1-96752 | 6/1989 | Japan . | |
| 2-310865 | 12/1990 | Japan . | |

OTHER PUBLICATIONS

English Abstract of Japanese Patent Laid–Open No. 55–67975, dated May 22, 1980.
English Abstract of Japanese Patent Laid–Open No. 56–19561, dated Feb. 2, 1981.
English Abstract of Japanese Patent Laid–Open No. 58–57721, dated Apr. 6, 1983.
English Abstract of Japanese Patent Laid–Open No. 59–124066, dated Jul. 18, 1984.
English Abstract of Japanese Patent Laid–Open No. 63–142574, dated Jun. 14, 1988.
English Abstract of Japanese Patent Laid–Open No. 1–89946, dated Apr. 5, 1989.
English Abstract of Japanese Patent Laid–Open No. 2–310865, dated Dec. 26, 1990.

Primary Examiner—Thomas M. Dougherty
Assistant Examiner—Judson H. Jones
Attorney, Agent, or Firm—Finnegan, Henderson, Farabow, Garrett & Dunner

[57] ABSTRACT

A swing-type actuator having: (a) an upper yoke made of a ferromagnetic material, (b) a permanent magnet assembly constituted by a lower yoke made of a ferromagnetic material and opposing the upper yoke and a flat permanent magnet attached to the lower yoke; (c) a base member made of a thermoplastic resin and having a hold portion projecting from an upper surface of the base member for defining a space into which the permanent magnet assembly is received and support portions projecting from an upper surface of the base member for fixing the upper yoke such that there is a magnetic gap between the permanent magnet assembly and the upper yoke, the base member being integrally molded together with the permanent magnet assembly such that the permanent magnet assembly is fixed to the base member inside the hold portion; and (d) a swingable arm having one end adapted to receive a movable coil and the other end to which a function member is fixable, the movable coil being swingable in the magnetic gap.

7 Claims, 16 Drawing Sheets

U.S. PATENT DOCUMENTS

| | | | |
|---|---|---|---|
| 4,544,973 | 10/1985 | Van De Bult | 360/106 |
| 4,553,058 | 11/1985 | Iwasaki | 310/268 |
| 4,639,624 | 1/1987 | Ejiri et al. | 310/154 |
| 4,639,798 | 1/1987 | Harrison et al. | 360/73 |
| 4,639,863 | 1/1987 | Harrison et al. | 364/200 |
| 4,669,004 | 5/1987 | Moon et al. | 360/77 |
| 4,772,974 | 9/1988 | Moon et al. | 360/98 |
| 4,849,840 | 7/1989 | Fujioka | 360/104 |
| 4,855,853 | 8/1989 | Matsushita et al. | 360/106 |
| 4,879,617 | 11/1989 | Sampietro et al. | 360/106 |
| 4,949,194 | 8/1990 | MacPherson et al. | 360/104 |
| 4,951,023 | 8/1990 | Erd et al. | 355/222 |
| 4,985,652 | 1/1991 | Oudet et al. | 310/15 |
| 5,005,089 | 4/1991 | Thanos et al. | 360/77.08 |
| 5,027,241 | 6/1991 | Hatch et al. | 360/105 |
| 5,034,837 | 7/1991 | Schmitz | 360/105 |
| 5,119,254 | 6/1992 | Brown et al. | 360/106 |
| 5,122,703 | 6/1992 | Takahashi et al. | 310/36 |
| 5,140,210 | 8/1992 | Shirakawa | 310/156 |
| 5,148,071 | 9/1992 | Takahashi | 310/208 |
| 5,165,090 | 11/1992 | Takahashi et al. | 369/215 |
| 5,168,184 | 12/1992 | Umehara et al. | 310/13 |
| 5,168,185 | 12/1992 | Umehara et al. | 310/15 |
| 5,225,725 | 7/1993 | Shiraki et al. | 310/12 |
| 5,305,169 | 4/1994 | Anderson et al. | 360/105 |

FIG. 19 (a) Prior Art
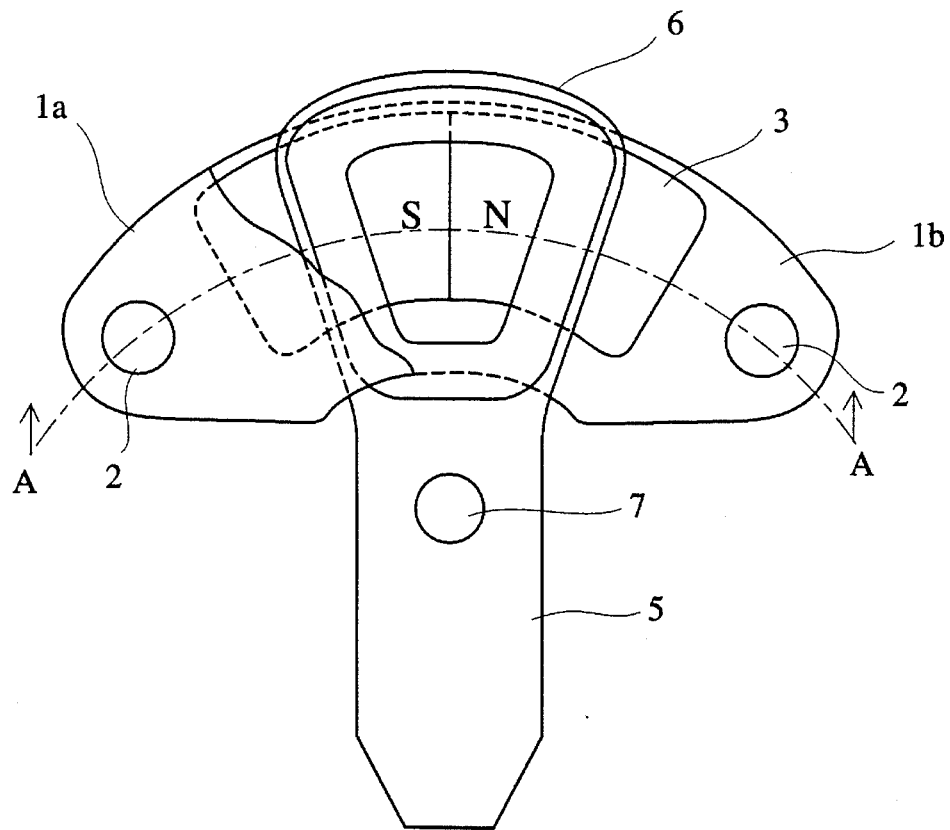
FIG. 19 (b) Prior Art
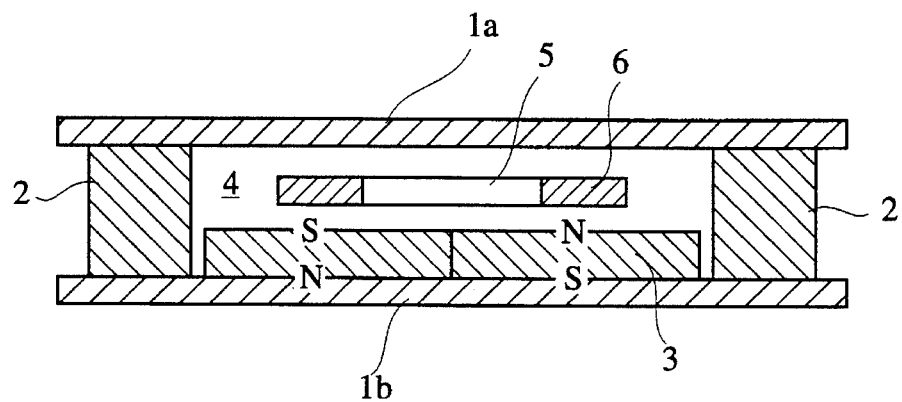

SWING-TYPE ACTUATOR

BACKGROUND OF THE INVENTION

The present invention relates to a swing-type actuator such as an actuator for magnetic disk drives, and more particularly to an improved thin swing-type actuator capable of swinging a function member such as a magnetic head along a circular course.

Conventionally, the positioning of a magnetic head on a recording track of a magnetic disk, etc. is conducted by a swing-type or rotation-type actuator as shown in FIGS. 19(a) and (b). In both figures, one yoke 1b is fixedly provided with permanent magnets 3, 3, and a pair of yokes 1a, 1b are assembled by supports 2, 2 such that different magnetic poles of the permanent magnets 3, 3 are opposing a magnetic gap 4 to form a magnetic circuit. An arm 5 has an aperture 7 in a center portion. A shaft (not shown) is rotatably fitted in the aperture 7, so that the arm 5 is rotatably supported by a housing (not shown). The arm 5 is also provided with an aperture (not shown) at one end for mounting a function member (not shown) such as a magnetic head to the arm 5. The arm 5 is arranged such that the movable coil 6 located in the magnetic gap 4 can swing around a shaft 7.

When an operation signal is supplied to the movable coil 6, a magnetic force generated from the movable coil 6 according to Fieming's left hand rule functions as an attraction force or a repulsion force to each permanent magnet 3, so that the arm 5 is rotated around the shaft inserted into the hole 7. As a result, a magnetic head fixed to a tip end of the arm 5 is positioned on a desired magnetic track of a magnetic disk (not shown). The direction of the rotation of the arm 5 can be changed by inverting the direction of current applied to the movable coil 6.

FIG. 20 is a perspective view showing members constituting the magnetic circuit of FIG. 19, and FIG. 21 is an exploded view showing them. In these figures, the same reference numerals are assigned to the same members as in FIG. 19. To regulate the swing span of the movable coil 6, there are stoppers 8, 8 mounted to the lower yoke 1b. Positioning pins 9, 9 —are mounted to the lower yoke 1b to fix a permanent magnet 3 at a desired position by contact with a periphery of the permanent magnet 3.

In the assembling of the members shown in FIG. 21, the positioning pins 9, 9—are first mounted to the lower yoke 1b at desired positions, and the permanent magnet 3 is then fixed to the lower yoke 1b by an adhesive. In this case, to cure the adhesive, it is necessary to heat and dry it, requiring a lengthy and troublesome operation of bonding the permanent magnet 3 to the lower yoke 1b. This leads to a large cost for the production of the swing-type actuator. Also, when the swing-type actuator is heated to dry and cure the adhesive, a harmful gas is generated from the adhesive, causing an environmental problem.

Next, after the permanent magnet 3 is fixed to the lower yoke 1b, supports 2, 2 and stoppers 8 are fixed to the lower yoke 1b, and then the upper yoke 1a is fixed to the supports 2, 2 by screws 2a, 2a. Since these members are fixed by screws and/or press-fitting, manual labor is needed extensively. Therefore, the production of the conventional swing-type actuator is costly because of long working time and many steps.

Recently, demand has become increasingly higher to make such a swing-type actuator thinner and less expensive. However, the above conventional swing-type actuator fails to meet such a demand because it is constituted by many parts and assembling of parts takes long working time.

OBJECT AND SUMMARY OF THE INVENTION

Accordingly, an object of the present invention is to provide a swing-type actuator free from the problems of the conventional swing-type actuator, thereby having such a structure that it can be easily assembled at a low cost.

The swing-type actuator according to the first embodiment of the present invention comprises:

(a) an upper yoke made of a ferromagnetic material, (b) a permanent magnet assembly constituted by a lower yoke made of a ferromagnetic material and opposing the upper yoke and a flat permanent magnet attached to the lower yoke;

(c) a base member made of a thermoplastic resin and having a hold portion projecting from an upper surface of the base member for defining a space into which the permanent magnet assembly is received and support portions projecting from an upper surface of the base member for fixing the upper yoke such that there is a magnetic gap between the permanent magnet assembly and the upper yoke, the base member being integrally molded together with the permanent magnet assembly, such that the permanent magnet assembly is fixed to the base member inside the hold portion; and (d) a swingable arm having one end adapted to receive a movable coil and the other end to which a function member is fixable, the movable coil being swingable in the magnetic gap.

In the second embodiment of the present invention, the permanent magnet assembly is press-fitted into the hold portion.

In the third embodiment of the present invention, the swing-type actuator comprises a cover member made of a thermoplastic resin in which the upper yoke is embedded, and the support portions are fixed to the cover member such that there is a magnetic gap between the permanent magnet assembly and the upper yoke.

In the fourth embodiment of the present invention, each of the support portions is integrally provided at a top thereof with a key portion which is fixed to the upper yoke by thermal deformation.

In the fifth embodiment of the present invention, each of said support portions is integrally provided at a top thereof with a key portion in the shape of an annular projection having a plurality of vertical slits, the key portion having such a slightly larger outer diameter than an inner diameter of the hole of the upper yoke that the detachment of the key portion from the hole of the upper yoke is prevented.

In the sixth embodiment of the present invention, the swing-type actuator further comprises a hold frame integrally projecting from an upper surface of the base member at a site near the movable coil of the swingable arm for receiving a permanent magnet for keeping the swingable arm at a stop position when the swing-type actuator is not operated.

In the seventh embodiment of the present invention, the base member is integrally provided with a shaft for rotatably supporting the swingable arm.

In the eighth embodiment of the present invention, the swing-type actuator further comprises an auxiliary yoke made of a ferromagnetic material and embedded in each of the support portions, the auxiliary yoke being magnetically connected to the lower yoke extending in the base member.

In the ninth embodiment of the present invention, the hold portion of the base member has holes formed by positioning pins of an injection mold in the process of insert injection, the holes of the hold portion being filled with a thermoplastic resin.

In the tenth embodiment of the present invention, the hold portion of the base member integrally has a cover portion which covers the permanent magnet.

BRIEF DESCRIPTION OF THE DRAWINGS

FIG. 19(a) is a partially cut-out plan view showing the conventional swing-type actuator;

FIG. 19(b) is a cross-sectional view taken along the curved line A—A in FIG. 19(a);

DETAILED DESCRIPTION OF THE PREFERRED EMBODIMENTS

[1] First embodiment

Figure 20:
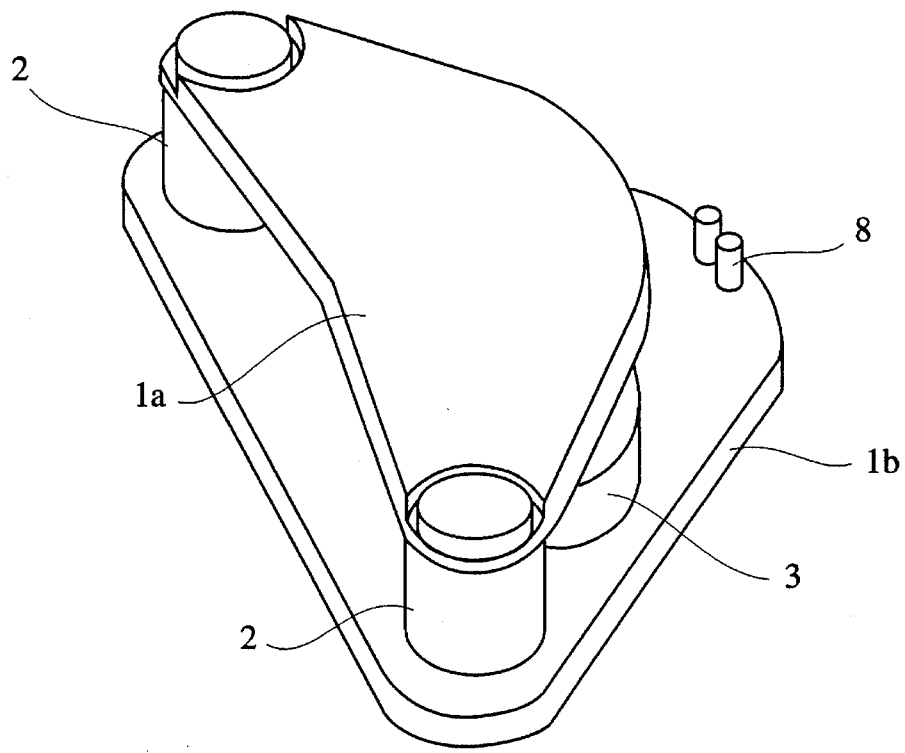
FIG. 20 is a perspective view showing the conventional swing-type actuator of FIG. 19.
Figure 21:
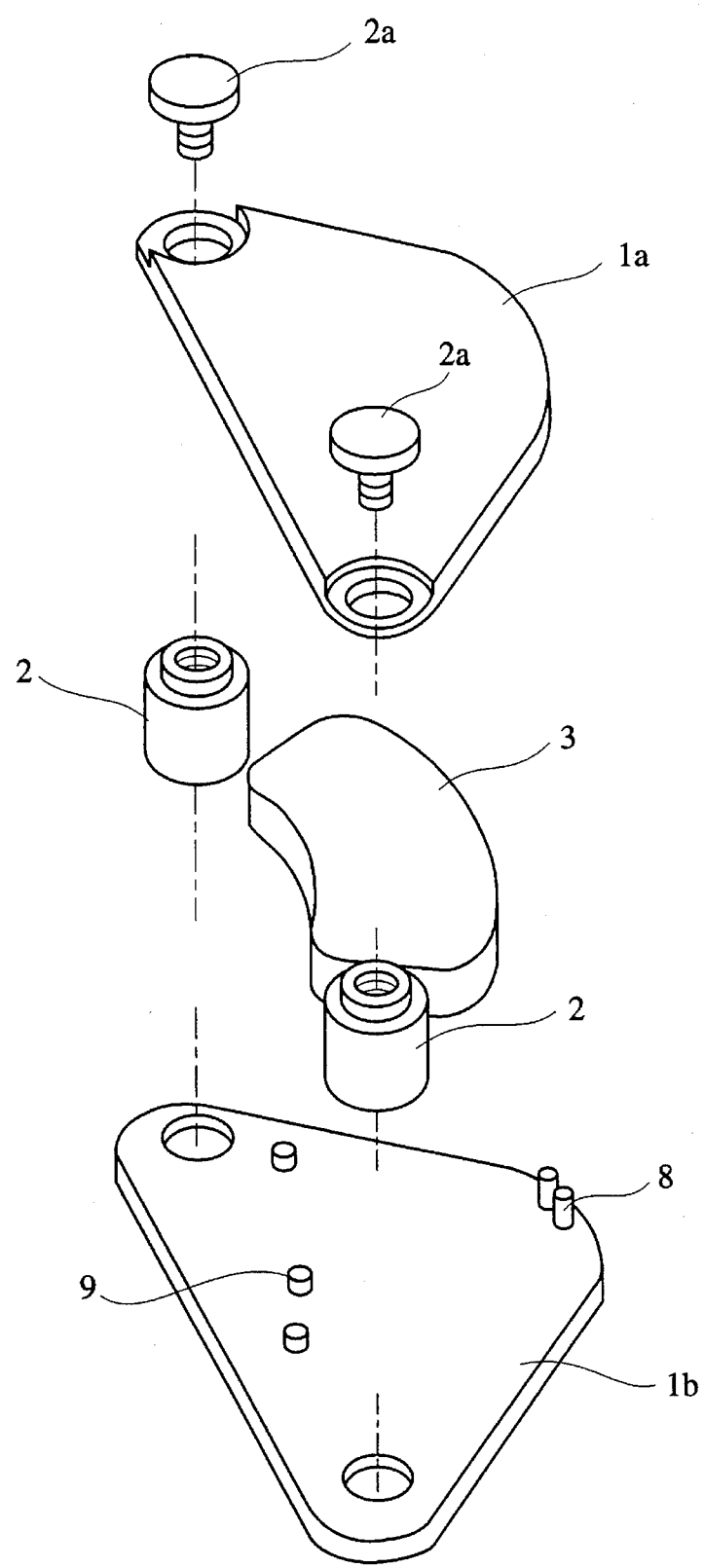
FIG. 21 is an exploded perspective view showing the conventional swing-type actuator of FIG. 19.

The first embodiment of the present invention is shown in FIGS. 1(a) and 1(b). The same reference numerals are assigned to the same parts as those in FIGS. 19–21.

The swing-type actuator comprises a base member 10 having a hold portion 11, support portions 2, 2 and stopper portions 8, 8 all projecting from an upper surface of the base member 10, an upper yoke 14 made of a ferromagnetic material such as soft iron, and a permanent magnet assembly 13 constituted by a lower yoke 12 made of a ferromagnetic material such as soft iron and opposing the upper yoke 14 and a flat permanent magnet 3 attached to the lower yoke 12. The upper yoke 14 is in a rounded triangular shape and has pores 15, 15 in both end portions. The peripheral shape of the upper yoke 14 is not particularly restricted, but in this embodiment its shape is such that the upper yoke 14 entirely covers the permanent magnet assembly 13. The base member 10 is also in a rounded triangular shape. The hold portion 11 projecting from an upper surface of the base member 10 is a low, circular wall having such a shape as to define a space into which the permanent magnet assembly 13 is closely received so that accurate positioning of the permanent magnet assembly 13 can be achieved.

Each stopper portion 2 has a threaded hole opening in a top surface thereof, into which a screw 2a is threaded with the upper yoke 14 disposed between the stopper portions 2, 2 and the screws 2a, 2a. By fixing the upper yoke 14 to the base member 10, a magnetic gap is formed between the permanent magnet 3 and the upper yoke 14.

In order that the permanent magnet 3 is in a thin plate shape, it is preferable to prepare the permanent magnet 3 by an Nd-Fe-B permanent magnet. The permanent magnet 3 has a fan shape and magnetized in a thickness direction such that different magnetic poles appear on the same surface side as shown by N pole and S pole in FIG. 1. Such magnetization can be achieved by magnetizing two portions of the permanent magnet 3 in opposite directions, or by combining two permanent magnets each magnetized in opposite directions. The flat permanent magnet 3 is attached to the lower yoke 12 having the same peripheral shape as the permanent magnet 3 by an adhesive, etc. If necessary, the lower yoke 12 may be larger than the permanent magnet 3 when viewed from above.

A swingable arm (not shown) to be assembled in this swing-type actuator may have a shape as shown in FIG. 19.

Such a swing-type actuator has one end adapted to receive a movable coil and the other end to which a function member is fixable. The position of the swingable arm rotatably supported by a housing (not shown) is determined such that the movable coil is swingable in the magnetic gap.

The base member 10 having the hold portion 11, the support portions 2, 2 and the stopper portions 8, 8 are made of a thermoplastic resin and integrally molded by an injection molding method, etc. The thermoplastic resins for constituting the base member 10 may be known heat-resistant resins such as polyphenylene sulfide resins, polybutylene terephthalate resins, polyamide resins, polyimide resins, polyamideimide resins, polyester resins, etc. These resins have a longitudinal modulus of preferably $10 \times 10^4$ kg/cm$^2$ or more (measured according to ASTM D-638), and more preferably $13 \times 10^4$ kg/cm$^2$ or more. Particularly, liquid crystal polyester resins, one of thermoplastic liquid crystal polymers, are preferable.

The liquid crystal polyester resins include (a) copolymers of parahydroxybenzoic acid and polyethylene terephthalate, (b) copolymers of poly-p-hydroxybenzoate aromatic dicarboxylic acid and aromatic diol, (c) copolymers of poly-p-hydroxybenzoate and naphthoic acid, etc. From the aspect of strength and modulus, aromatic liquid crystal polyester resins (b) and (c) are preferable, and (c) is more preferable. Particularly, since the aromatic polyester resins (c) have rigid molecular chains oriented in the flow direction in the molding process, they show large longitudinal modulus in that direction. In addition, they show good vibration absorbing properties and small linear expansion coefficient (near those of metals).

The liquid crystal polymers show high fluidity and so can be easily molded when heated at a liquid crystal temperature lower than a melting point. Particularly, liquid crystal polymers having longitudinal modulus (tensile modulus) of $16 \times 10^4$ kg/cm$^2$ or more are preferable. Specific examples of such aromatic, thermotropic liquid crystal polyester resins include Bectra A130 (longitudinal modulus: $18 \times 10^4$ kg/cm$^2$), C130 ($16 \times 10^4$ kg/cm$^2$), A230 ($30 \times 10^4$ kg/cm$^2$), B230 ($38 \times 10^4$ kg/cm$^2$), A410 ($21 \times 10^4$ kg/cm$^2$), A422 ($18 \times 10^4$ kg/cm$^2$), C400 ($17 \times 10^4$ kg/cm$^2$) and A540 ($16 \times 10^4$ kg/cm$^2$) each manufactured by Celanese; XYDAR RC-210 ($16.2 \times 10^4$ kg/cm$^2$) and G-43C ($16.1 \times 10^4$ kg/cm$^2$) manufactured by Dartco, etc.

Incidentally, the longitudinal modulus is $220 \times 10^4$ kg/cm$^2$(steel), $68 \times 10^4$ kg/cm$^2$(aluminum), $4.2 \times 10^4$ kg/cm$^2$ (methacrylic resins), $3.2$–$3.6 \times 10^4$ kg/cm$^2$(polystyrene resins), $10 \times 10^4$ kg/cm$^2$(polyphenylene sulfide resins). Accordingly, the above liquid crystal polymers show larger rigidity than general thermoplastic resins.

To increase mechanical strength and heat resistance, glass fibers, carbon fibers, etc. may be added to these liquid crystal polymers. The amount of such fillers is 10–50 weight %, preferably 20–40 weight %.

Thermoplastic resins usable in the present invention have flexural modulus of $13 \times 10^4$ kg/cm$^2$ or more (measured according to ASTM D-792). Such resins include, in addition to the above-mentioned resins, polyphenylene sulfides such as Ryton R-4 ($14 \times 10^4$ kg/cm$^2$) manufactured by Phillips Petroleum; DIC.PPS FZ-1140 ($14 \times 10^4$ kg/cm$^2$) manufactured by Dainippon Ink and Chemicals, ASAHI.PPS RG-40JA ($14.4 \times 10^4$ kg/cm$^2$) manufactured by Asahi Glass; Fortton 1140A1 ($13 \times 10^4$ kg/cm$^2$) manufactured by Polyplastics, GS-40 ($15 \times 10^4$ kg/cm$^2$), G-10 ($20 \times 10^4$ kg/cm$^2$), G-6 ($18 \times 10^4$ kg/cm$^2$), G-4F ($14 \times 10^4$ kg/cm$^2$) and FC-5 ($16 \times 10^4$ kg/cm$^2$) manufactured by Tosoh Susteel, etc.

The integral structure of the base member 10 may be produced by an injection molding. In the injection molding, the permanent magnet assembly 13 is placed in a cavity of an injection mold, and a molten thermoplastic resin such as a carbon fiber-reinforced thermoplastic polyphenylene sulfide resin is injected into the cavity. After solidification, the resulting molding is taken out of the mold. Since the base member 10 to which the permanent magnet assembly 13 is fixed can be obtained as an integral molding by a single molding step, the production cost of the swing-type actuator can be greatly reduced.

The assembling of the swing-type actuator can be easily conducted by placing the upper yoke 14 on the support portions 2, 2 of the base member 10 and theadably inserting screws 2a, 2a into the holes 15, 15 of the upper yoke 14 and the threaded holes of the support portions 2, 2 of the base member 10 to fix the upper yoke 14 to the base member 10.

Figure 1:
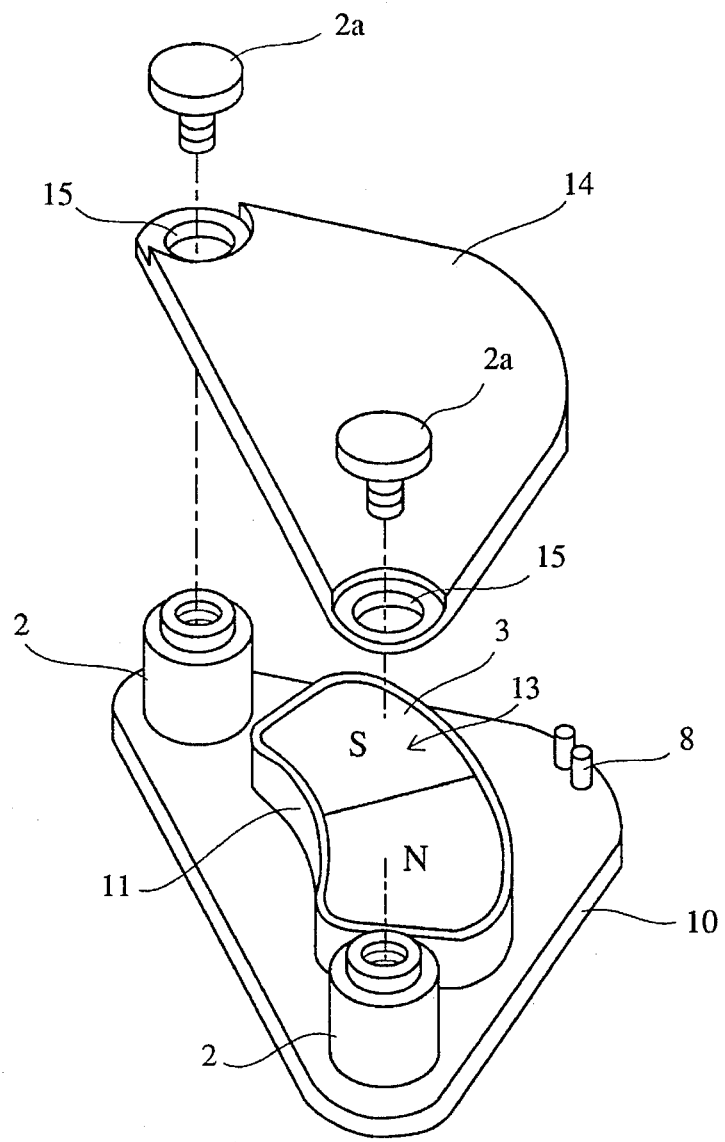
FIG. 1(a) is an exploded perspective view showing the swing-type actuator according to the first embodiment of the present invention.
FIG. 1(b) is a perspective view showing the permanent magnet assembly used in the swing-type actuator of FIG. 1(a)
Figure 1:
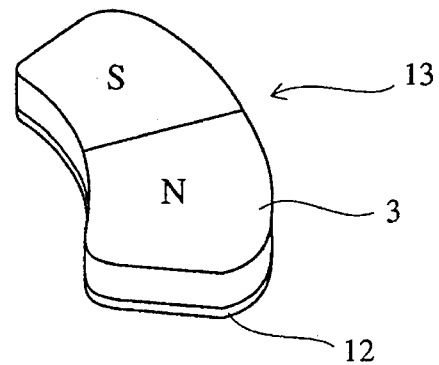

In this embodiment shown in FIG. 1, the hold portion 11 has a continuous circular wall. However, it should be noted that the hold portion 11 is not required to have a continuous circular wall, and that it may be constituted by a plurality of projections for fixing the permanent magnet assembly 13. Also, the fixing of the upper yoke 14 to the base member 10 may be achieved by using rivets instead of screws or by press-fitting fastening members to holes of the support portion 2, 2. In addition, the functioning member attached to one end of the arm may be, in addition to the magnetic head, a head for an optical disc drive or an optomagnetic disc drive.

An additional flat permanent magnet magnetized in a thickness direction having opposite magnetic poles on the same surface thereof may be attached to a lower surface of the upper yoke 14 such that the magnetic poles of the additional flat permanent magnet are opposing different magnetic poles of the permanent magnet 3 in the permanent magnet assembly 13. This is true of the following second to tenth embodiments.

As described above, since the base member is integrally molded with the permanent magnet assembly positioned in the hold portion of the base member, assembling of the swing-type actuator is extremely easy, resulting in high productivity and low cost. Also, this structure makes it possible to provide a miniaturized thin swing-type actuator.

[2] Second embodiment

Figure 2:
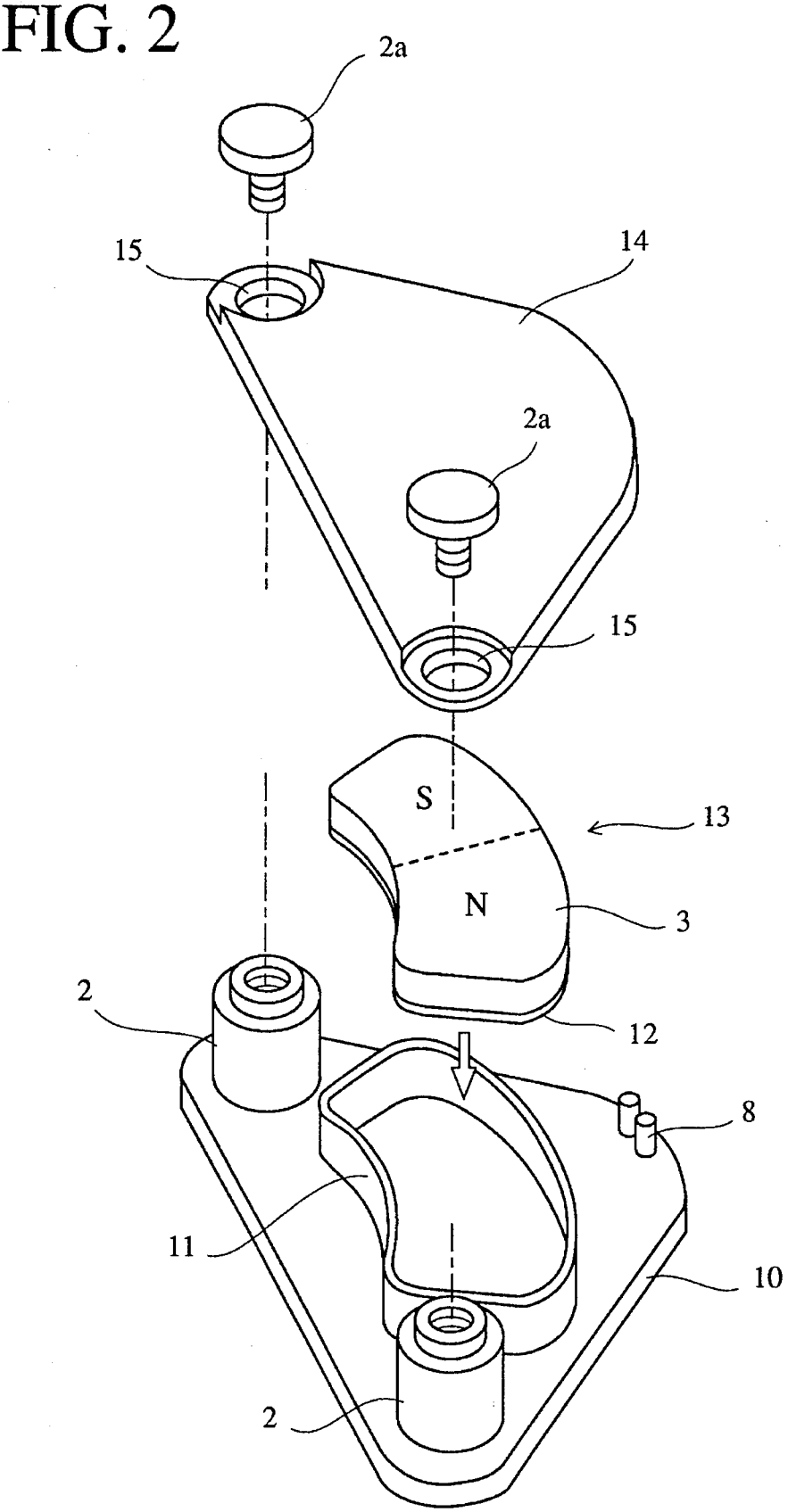
FIG. 2 is an exploded perspective view showing the swing-type actuator according to the second embodiment of the present invention.

FIG. 2 shows the swing-type actuator according to the second embodiment of the present invention, in which the same reference numerals are assigned to the same parts as those in FIG. 1.

The feature of the second embodiment is that the permanent magnet assembly 13 is press-fitted into the hold portion 11 projecting from an upper surface of the base member 10. A size of an inner side wall of the hold portion 11 is slightly smaller than a size of a side wall of the permanent magnet assembly 13. However, since the base member 10 integrally provided with the hold portion 11 is made of a thermoplastic resin such as a glass fiber— or carbon fiber-reinforced thermoplastic polyphenylene sulfide resin, the hold portion 11 shows good flexibility and resilience. Therefore, by press-fitting the permanent magnet assembly 13 into the hold portion 11, the permanent magnet assembly 13 can be surely fixed in the hold portion 11.

With respect to the other members and their materials, they may be the same as those in the first embodiment. Therefore, their explanations will be omitted here, and please refer to the section of "[1] First embodiment."

[3] Third embodiment

Figure 3:
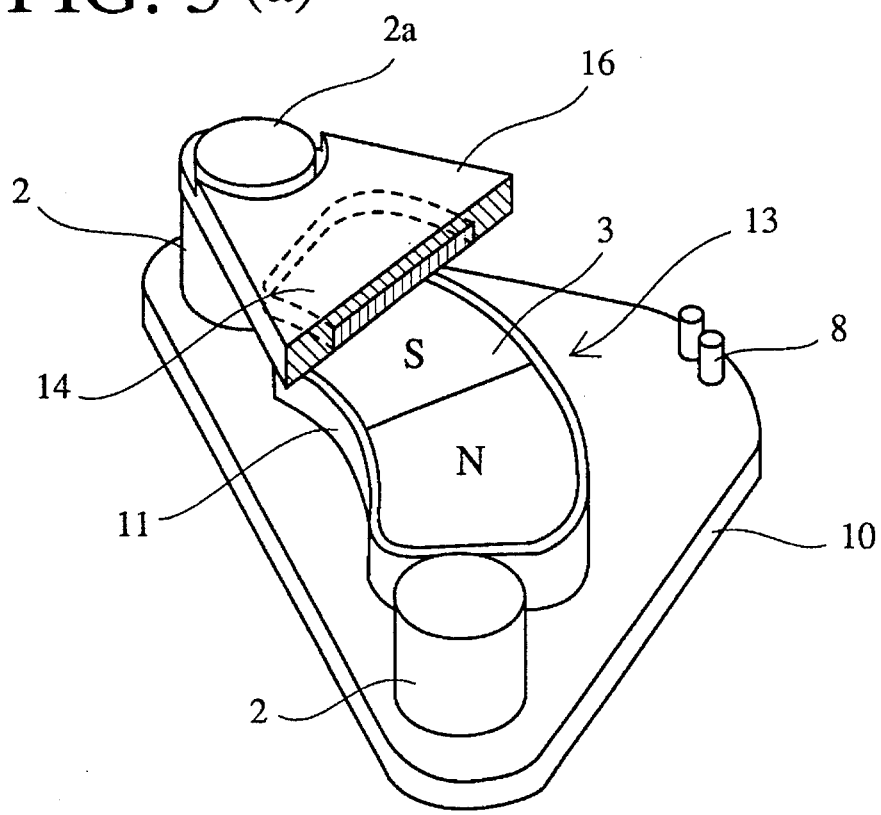
FIG. 3(a) is a partially cut-out perspective view showing the swing-type actuator according to the third embodiment of the present invention.
FIG. 3(b) is a horizontal cross-sectional view taken in FIG. 3(a)
Figure 3:
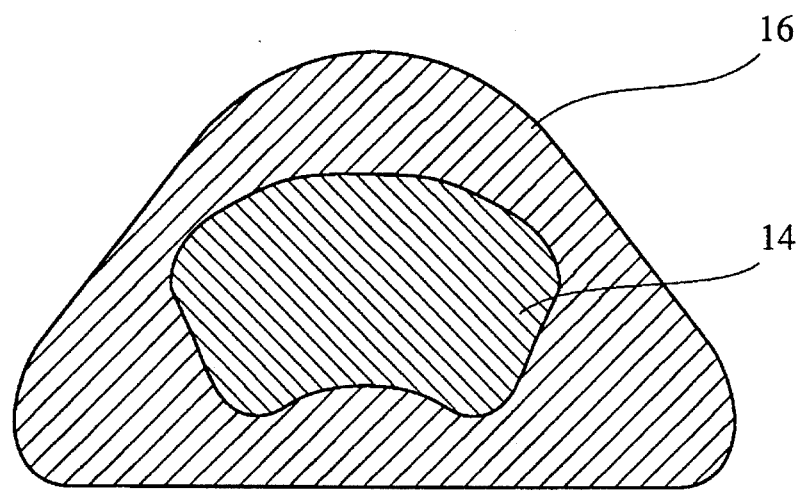

FIGS. 3(a) and 3(b) show the swing-type actuator according to the third embodiment of the present invention, in which the same reference numerals are assigned to the same parts as those in FIG. 1.

The feature of the third embodiment is that the upper yoke 14 is embedded in the cover member 16 made of a thermoplastic resin which is fixed to the stopper portions 2, 2 of the base member 10. Since there should be a magnetic gap between the upper yoke 14 and the permanent magnet 3, it is preferable that the upper yoke 14 is embedded in the cover member 16 such that a lower surface of the upper yoke 14 is exposed to the magnetic gap.

The shape of the upper yoke 14 is preferably the same as that of the permanent magnet 3 when viewed from above. Since the permanent magnet 3 is in a fan shape, the upper yoke 14 is preferably in a fan shape. It is preferable that the upper yoke 14 has such a size that it can substantially cover the permanent magnet 3.

The integral structure of the cover member 16 and the upper yoke 14 may be produced by an injection molding. In the injection molding, the upper yoke 14 is placed in a cavity of an injection mold, and a molten thermoplastic resin is injected into the cavity. After solidification, the resulting molding is taken out of the mold. Since the cover member 16 in which the upper yoke 14 is embedded can be obtained as an integral molding by a single molding step.

With respect to tile other members and their materials, they may be the same as those in the first embodiment. Therefore, their explanations will be omitted here, and please refer to the section of "[1] First embodiment."

[4] Fourth embodiment

Figure 4:
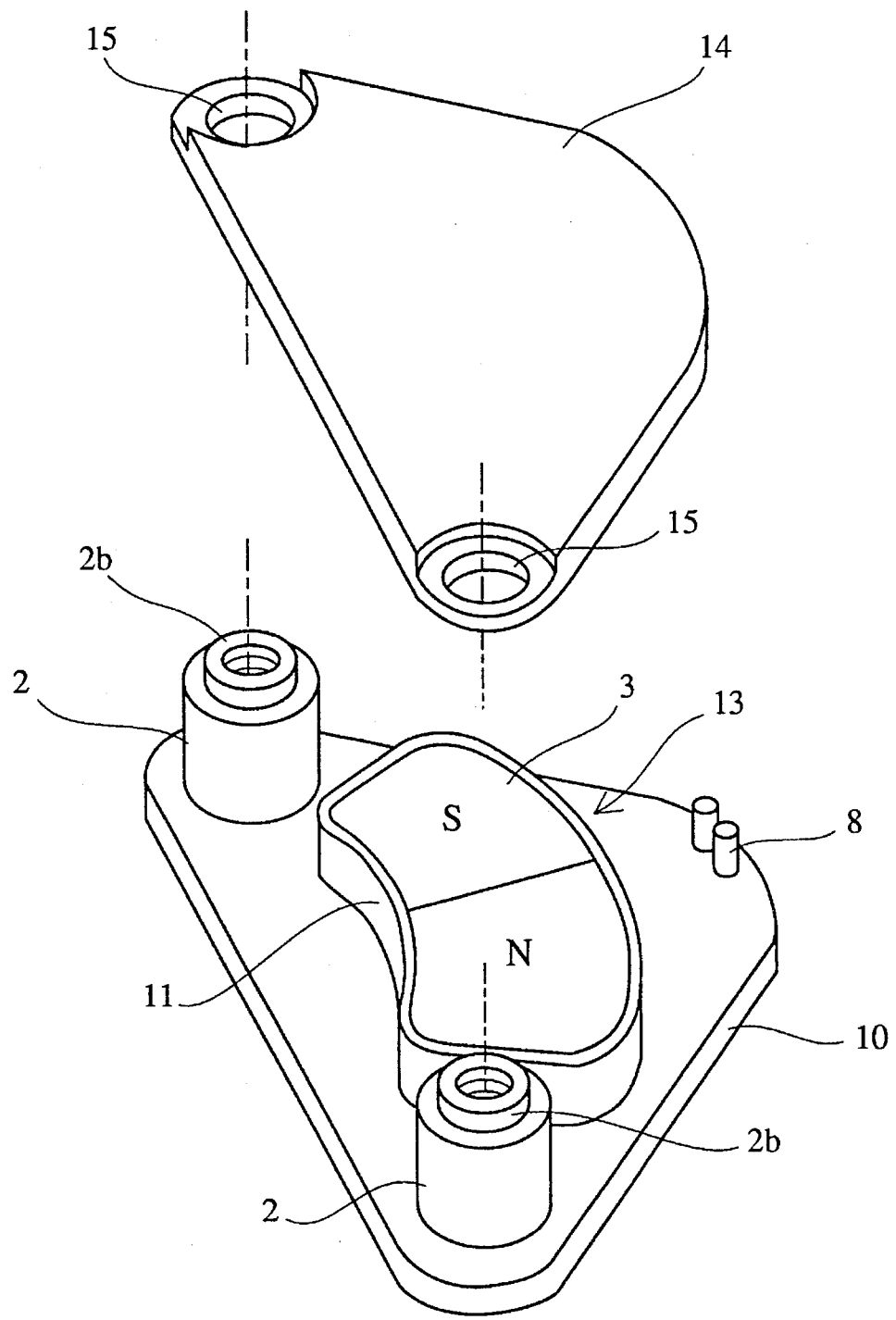
FIG. 4 is an exploded perspective view showing the swing-type actuator according to the fourth embodiment of the present invention.
Figure 5:
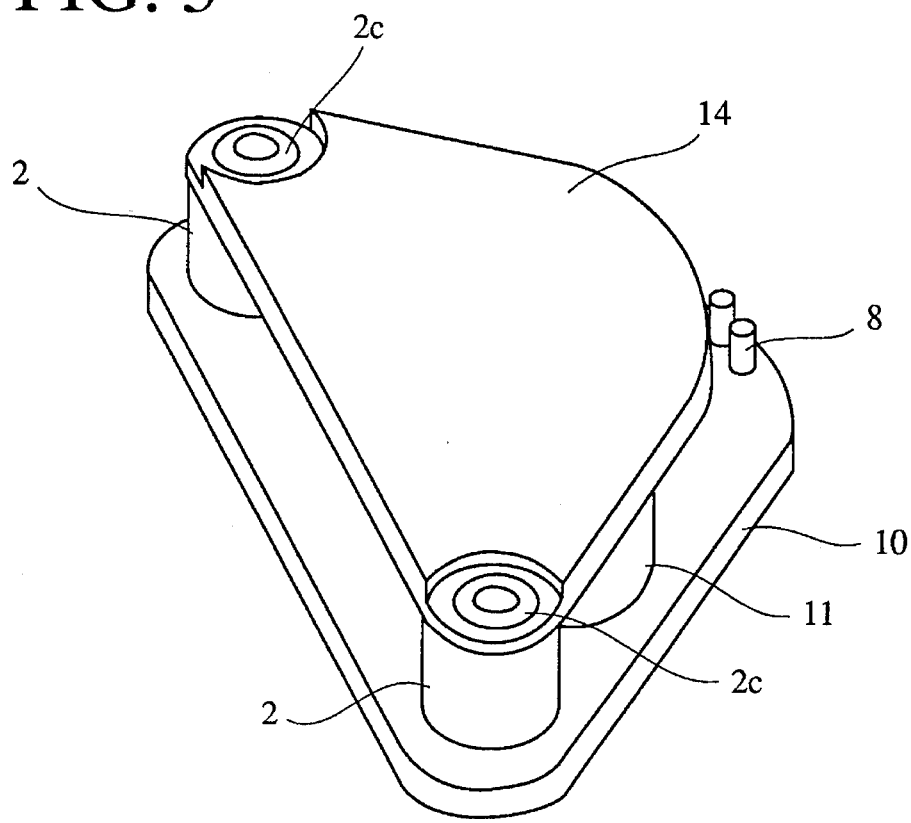
FIG. 5 is a perspective view showing the swing-type actuator according to the fourth embodiment of the present invention.
Figure 6:
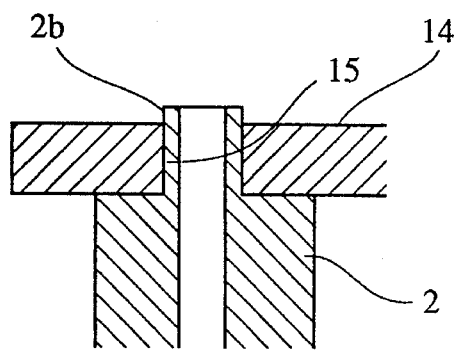
FIG. 6(a) is a vertical cross-sectional view of the key portion inserted into the hole of the upper yoke in the swing-type actuator of the fourth embodiment.
FIG. 6(b) is a vertical cross-sectional view of the key portion whose tip end portion is thermally deformed in the hole of the upper yoke in the swing-type actuator of the fourth embodiment.
Figure 6:
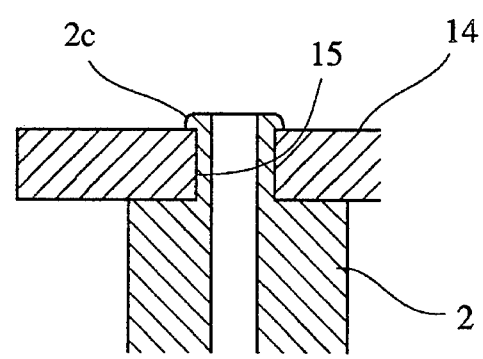

FIGS. 4–6 show tile swing-type actuator according to the fourth embodiment of the present invention, in which the same reference numerals are assigned to the same parts as those in FIG. 1.

The feature of the fourth embodiment is that each of the support portions 2, 2 projecting from an upper surface of the base member 10 for fixing the upper yoke 14 is integrally provided at a top thereof with a key portion 2b which is fixed to the upper yoke 14 by thermal deformation.

The key portion 2b may be an annular projections having such a height that it can expose through the hole 15 of the upper yoke 14 as shown in FIG. 6(a). Since the support portion 2 integral with the base member 10 is made of a thermoplastic resin, it is easy to deform the key portion 2b by locally heating it to a temperature higher than the softening point of the thermoplastic resin while pressing. For this purpose high-frequency heating may be used together with a pressing means. An ultrasonic welding apparatus is also preferable. The thermally deformed key portion 2b has a lock shape as shown in FIG. 6(b). After the thermal deformation, since the key portion 2b has an enlarged portion as a lock portion at its end, the support portion 2 cannot be detached from the upper yoke 14. The swing-type actuator after fixing is shown in FIG. 5.

With respect to the other members and their materials, they may be the same as those in the first embodiment. Therefore, their explanations will be omitted here, and please refer to the section of "[1] First embodiment."

[5] Fifth embodiment

Figure 7:
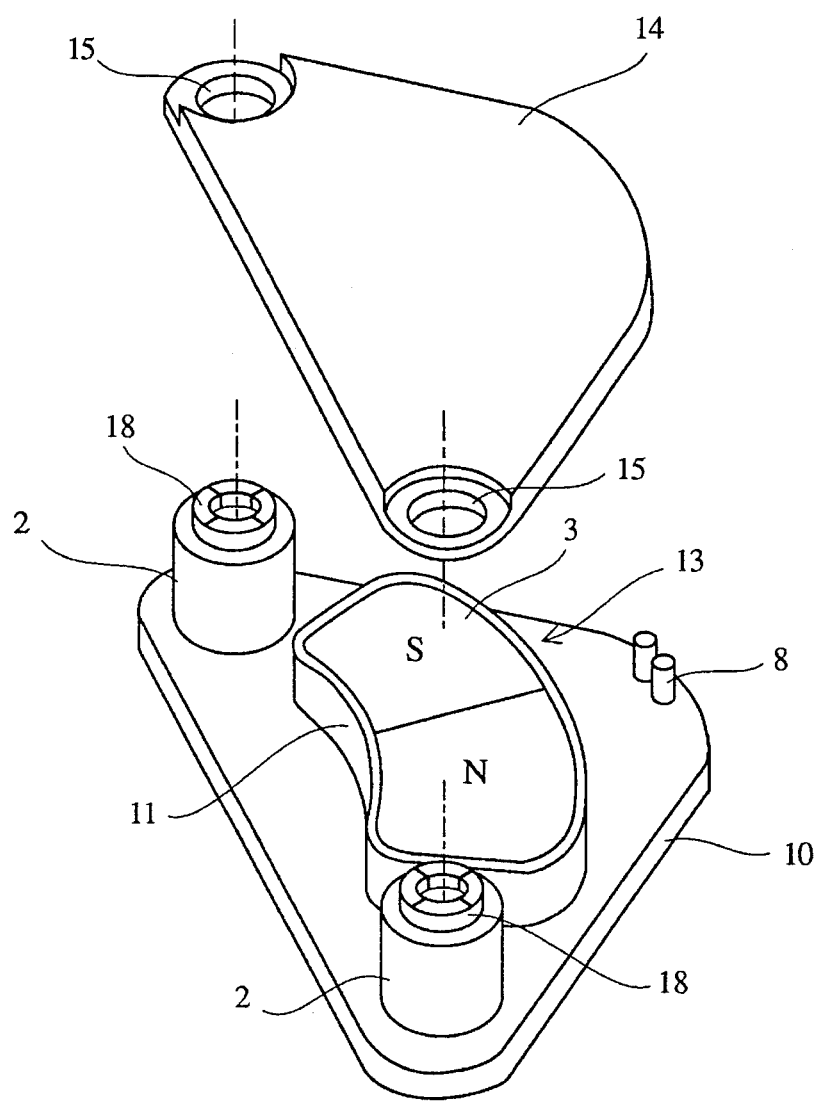
FIG. 7 is an exploded perspective view showing the swing-type actuator according to the fifth embodiment of the present invention.
Figure 8:
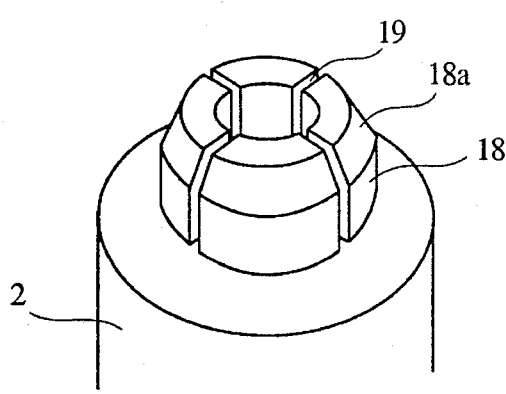
FIG. 8(a) is an enlarged view showing the key portion of the support portion in the swing-type actuator of the fifth embodiment.
FIG. 8(b) is an enlarged view showing the modified key portion of the support portion in the fifth embodiment.
Figure 8:
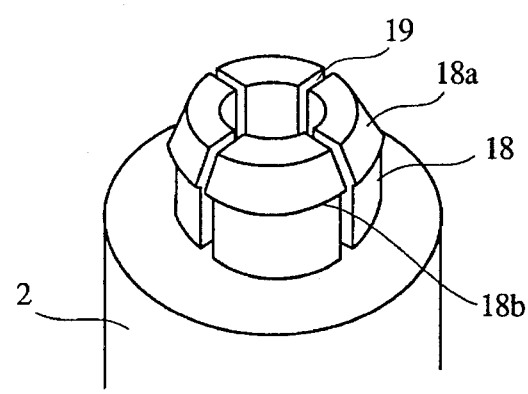

FIGS. 7 and 8 show the swing-type actuator according to the fifth embodiment of the present invention, in which the same reference numerals are assigned to the same parts as those in FIG. 1.

The feature of the fifth embodiment is that each of the support portions 2, 2 projecting from an upper surface of the base member 10 for fixing the upper yoke 14 is integrally provided at a top thereof with a key portion 18 in the shape of an annular projection having a plurality of vertical slits 19. An outer diameter of the key portion 18 is slightly larger than an inner diameter of the hole 15 of the upper yoke 14. Since the support portion 2 integral with the base member 10 is made of a thermoplastic resin, it is easily deformable.

The key portion 18 has a tapered end portion 18a to make it easier to enter into the hole 15 of the upper yoke 14 as shown in FIG. 8(a). The width of each slit 19 may be determined such that the key portion 18 is resiliently deformed when the key portion 18 is pressed into the hole 15 of the upper yoke 14. After it is inserted into the hole 15 of the upper yoke 14, the detachment of the key portion 18 is prevented by a resilient repulsion of the slit projections of the key portion 18.

In a modification of the fifth embodiment, the key portion 18 may be provided with a latch portion 18b in the form of an annular side projection as shown in FIG. 8(b), which serves to prevent the key portion 18 from being detached from the hole 15 of the upper yoke 14 once the latch portion 18b passes through the hole 15 of the upper yoke 14.

The assembling of this swing-type actuator can be easily conducted by inserting the key portions 18, 18 of the support portions 2, 2 of the base member 10 into the holes 15, 15 of the upper yoke 14 and pressing them so that the key portions 18, 18 are forced into the holes 15, 15 of the upper yoke 14.

With respect to the other members and their materials, they may be the same as those in the first embodiment. Therefore, their explanations will be omitted here, and please refer to the section of "[1] First embodiment."

[6] Sixth embodiment

Figure 9:
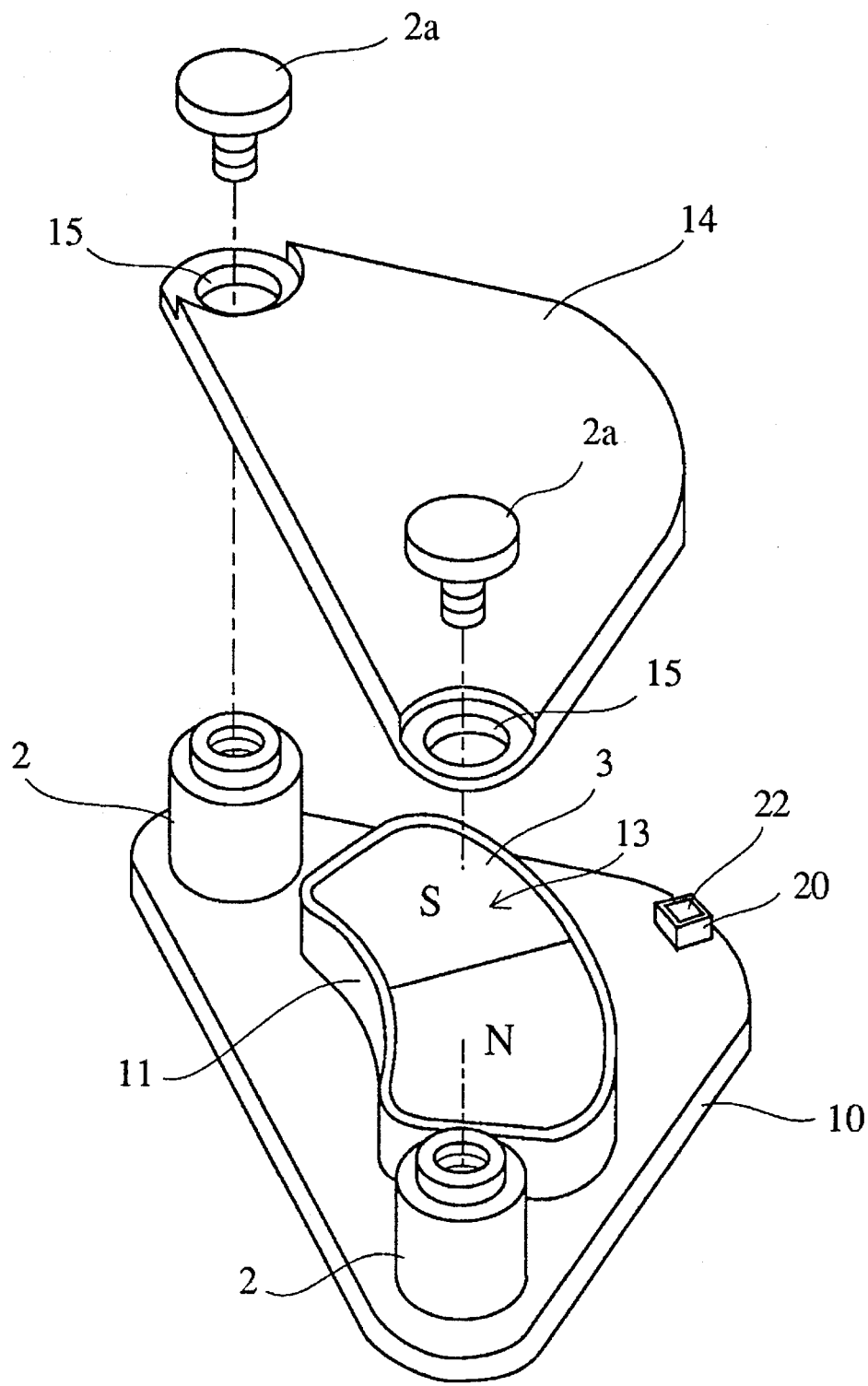
FIG. 9 is an exploded perspective view showing the swing-type actuator according to the sixth embodiment of the present invention.

FIG. 9 shows the swing-type actuator according to the sixth embodiment of the present invention, in which the same reference numerals are assigned to the same parts as those in FIG. 1.

The feature of the sixth embodiment is that there is a hold frame 20 integrally projecting from an upper surface of the base member 10 at a site near the movable coil of the swingable arm for receiving a permanent magnet 22 for keeping the swingable arm at a stop position when the swing-type actuator is not operated. The permanent magnet 22 may be positioned in any direction, vertical or horizontal, with respect to its magnetic pole.

The integral structure of the base member 10 may be produced by an injection molding. In the injection molding, the permanent magnet assembly 13 is placed in a cavity of an injection mold at a site corresponding to the hold portion 11, and the permanent magnet 22 is placed in the cavity at a site corresponding to the hold frame 20. A molten thermoplastic resin such as a carbon fiber-reinforced thermoplastic polyphenylene sulfide resin is injected into the cavity. After solidification, the resulting molding is taken out of the mold. Since the base member 10 to which the permanent magnet assembly 13 and the permanent magnet 22 are fixed can be obtained as an integral molding by a single molding step, the production cost of the swing-type actuator can be greatly reduced.

Since the permanent magnet 22 for keeping the swingable arm at a stop position is generally small, it may be difficult to position the permanent magnet 22 in the mold cavity at a proper site. In such a case, the hold frame 20 may be integrally molded with the base member 10, and the permanent magnet 22 may be press-fitted into the hold frame 20. In this case, an adhesive may be used to strongly fix the permanent magnet 22 to the hold frame 20.

With respect to the other members and their materials, they may be the same as those in the first embodiment. Therefore, their explanations will be omitted here, and please refer to the section of "[1] First embodiment."

[7] Seventh embodiment

Figure 10:
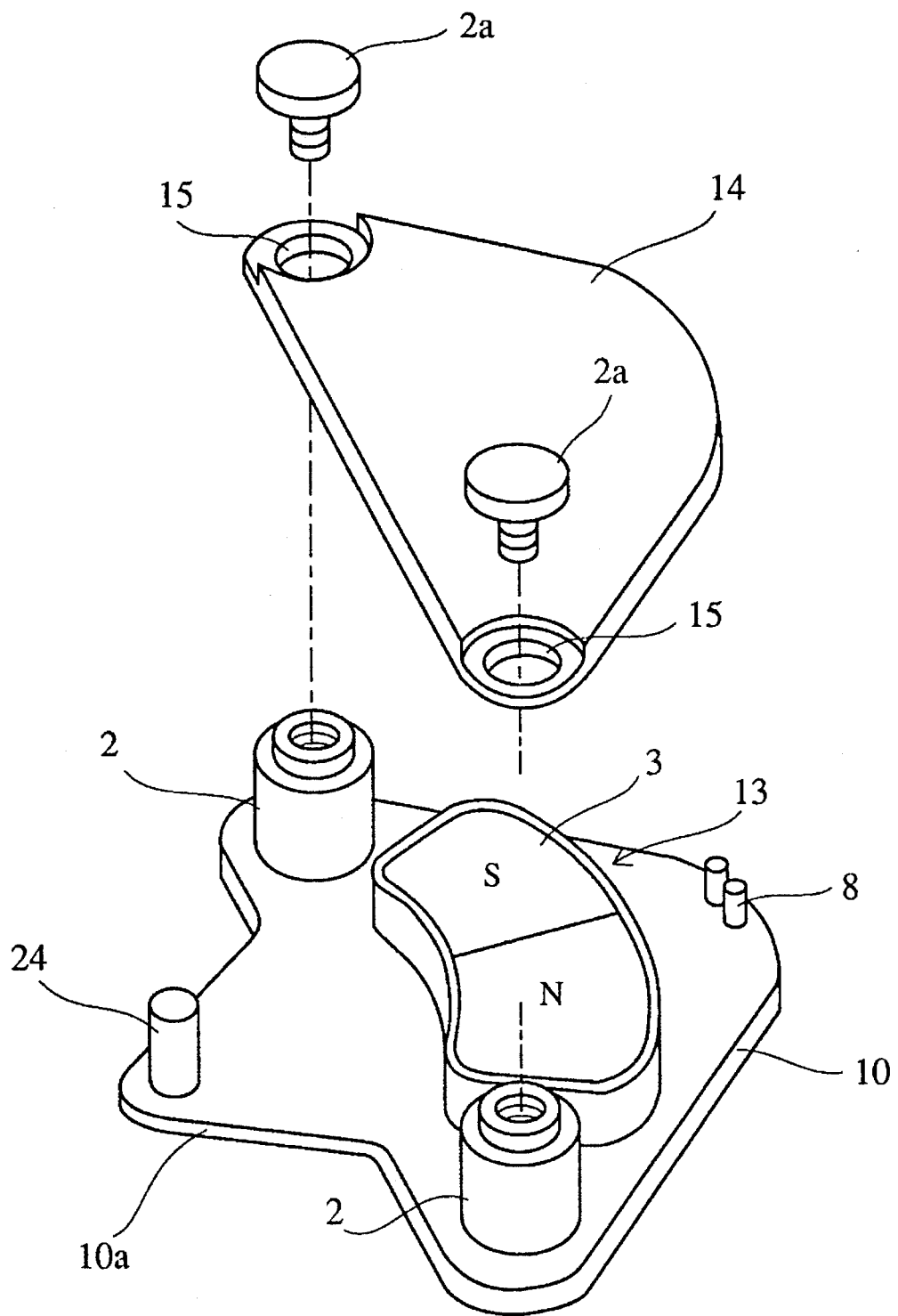
FIG. 10 is an exploded perspective view showing the swing-type actuator according to the seventh embodiment of the present invention.

FIG. 10 shows the swing-type actuator according to the seventh embodiment of the present invention, in which the same reference numerals are assigned to the same parts as those in FIG. 1.

The feature of the seventh embodiment is that the base member 10 is integrally provided with a shaft 24 for rotatably supporting the swingable arm. The shaft 24 may be provided with a bearing for rotatably supporting the swingable arm with reduced friction.

The shaft 24 may be molded integrally with the base member 10 from a thermoplastic resin. Alternatively, the shaft 24 made of a metal such as steel may be fixed the base member 10 by an insert molding. In the insert molding, the shaft 24 is placed in a cavity of an injection mold at a proper site, and a molten thermoplastic resin is injected into the cavity. After solidification, the resulting molding is taken out of the mold. In any case, since the base member 10 having the shaft 24 can be obtained by a single molding step, the production cost of the swing-type actuator can be greatly reduced.

With respect to the other members and their materials, they may be the same as those in the first embodiment. Therefore, their explanations will be omitted here, and please refer to the section of "[1] First embodiment."

[8] Eighth embodiment

Figure 11:
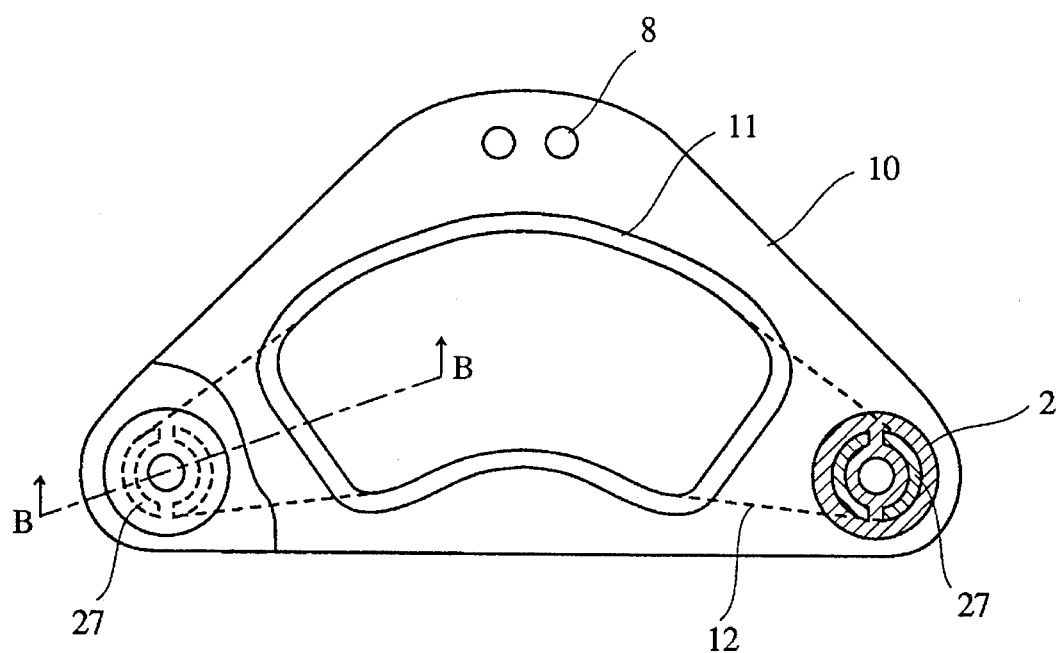
FIG. 11 is a partially cut-out and cross-sectional plan view showing the base member of the swing-type actuator according to the eighth embodiment of the present invention.
Figure 12:
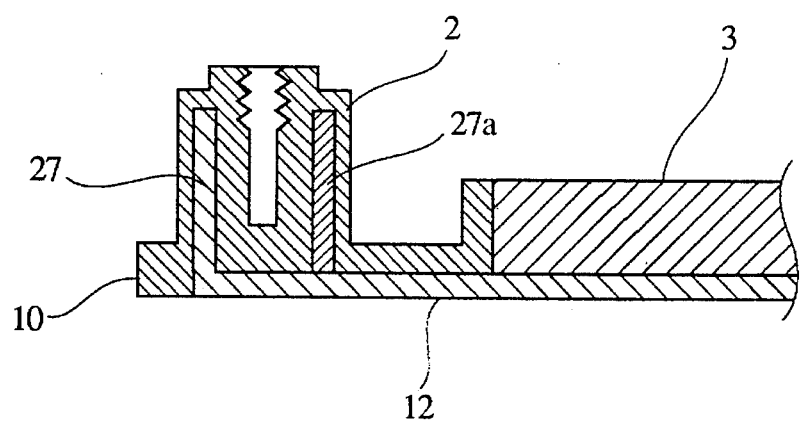
FIG. 12 is an enlarged cross-sectional view taken along the line B—B in FIG. 11.

FIGS. 11 and 12 show the swing-type actuator according to the eighth embodiment of the present invention, in which the same reference numerals are assigned to the same parts as those in FIG. 1.

The feature of the eighth embodiment is that there is an auxiliary yoke 27 made of a ferromagnetic material and embedded in each of the support portions 2, 2, the auxiliary yoke 27 being magnetically connected to the lower yoke 12 extending in the base member 10.

The auxiliary yoke 27 embedded in the support portion 2 preferably has an annular shape with or without vertical slit. In FIG. 11, the auxiliary yoke 27 is constituted by a C-shaped member. In this case, an additional C-shaped member 27a may be used to cause the auxiliary yoke 27 to be in an annular ring. The auxiliary yoke 27 preferably extends in substantially the entire length of the support portion 2, but it needs not be connected to the screw 2a threadably inserted into the support portion 2 as long as sufficient magnetic flux can pass through the lower yoke 12 and the upper yoke 14 via the auxiliary yoke 27.

As shown in FIG. 11, the lower yoke 12 extends to both support portions 2, 2 so that it is in contact with the auxiliary yoke 27 embedded in the support portion 2. In a portion on which the permanent magnet 3 is placed, the lower yoke 12 preferably has substantially the same peripheral shape as that of the permanent magnet 3.

In a case where the auxiliary yoke 27 is a separate member from the lower yoke 12, the auxiliary yoke 27 is preferably fixed to the lower yoke 12 by known fixing means before it is embedded in the support portion 2. However, it is preferable that the auxiliary yoke 27 and the lower yoke 12 constitutes an integral member. Namely, the auxiliary yoke 27 is preferably a part of the lower yoke 12. In this case, the auxiliary yoke 27 can be formed by press-deforming a part of the lower yoke 12.

In the integral formation of the base member 10, the auxiliary yoke 27 fixed to the lower yoke 12 or the lower yoke 12 integrally provided with the auxiliary yoke 27 is placed in a cavity of an injection mold at a proper site, and a molten thermoplastic resin is injected into the cavity. After solidification, the resulting molding is taken out of the mold. Since the base member 10 having the auxiliary yoke 27 and the lower yoke 12 embedded therein can be obtained by a single molding step, the production cost of the swing-type actuator can be greatly reduced.

In the structure of this embodiment, since a substantially closed magnetic circuit is formed through the permanent magnet 3, the lower yoke 12, the auxiliary yokes 27, 27 and the upper yoke 14, the yoke is not likely to be saturated even when the permanent magnet 3 made of an R-TM-B type magnet alloy, wherein R is at least one rare earth element of Nd, Pr, etc., and TM is at least one transition element of Fe, etc., is used, and a magnetic flux in the magnetic gap is greatly increased.

With respect to the other members and their materials, they may be the same as those in the first embodiment. Therefore, their explanations will be omitted here, and please refer to the section of "[1] First embodiment."

[9] Ninth embodiment

FIGS. 13–16 show the swing-type actuator according to the ninth embodiment of the present invention, in which the same reference numerals are assigned to the same parts as those in FIG. 1.

The feature of the ninth embodiment is that the hold portion 11 of the base member 10 has holes 29 formed by positioning pins of an injection mold in the process of insert injection, the holes 29 of the hold portion 11 being filled with a thermoplastic resin.

Figure 13:
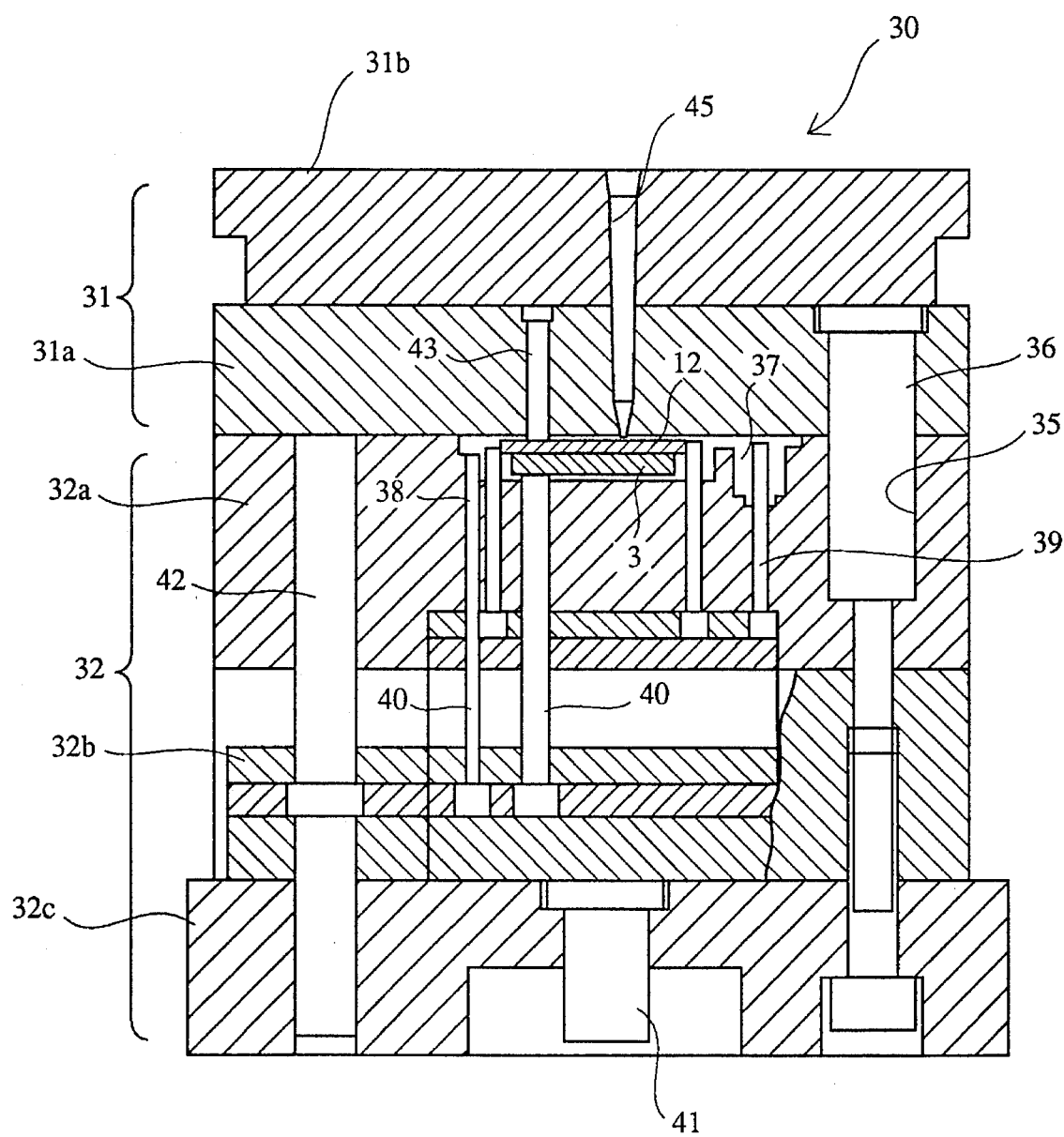
FIG. 13 is a cross-sectional view showing the injection mold for forming the swing-type actuator.

FIG. 13 shows an injection mold 30 for producing the base member 10 of this embodiment. In FIG. 13, 31 denotes a movable mold means composed of an upper mold plate 31a and a backup plate 31b, and 32 denotes a stationary mold means composed of a lower mold plate 32a, a push plate 32b and a base plate 32c. A guide hole 35 of the upper mold plate 31a of the stationary mold means 31 receives a guide pin 36.

The lower mold plate 32a is provided with a cavity 37 having a shape corresponding to the support portion 2, the base plate 10, the hold portion 11, etc., and has positioning pins 38 and a core pin 39 extending to the cavity 37. The push plate 32b is provided with push pins 40 and a push rod 41 and an return rod 42. 43 denotes a positioning pin disposed in the upper mold plate 31a, which abuts the lower yoke 12 inserted into the cavity 37. 45 denotes a sprue extending through the upper mold plate 31a and the backup plate 31b to the cavity 37.

In the production of the base member 10 integral with the permanent magnet assembly 13 by an insert molding method by using the above injection mold 30, the permanent magnet assembly 13 of the lower yoke 12 and the flat permanent magnet 3 is placed in the cavity 37, and the accurate positioning of the permanent magnet assembly 13 in the cavity 37 is conducted by the positioning pins 38, 38 and 43.

When the movable and stationary mold means 31, 32 are combined via the guide pin 36 in the guide hole 35, a back surface (upper surface in FIG. 13) of the lower yoke 12 is in contact with a tip end of the positioning pin 43 to prevent the permanent magnet assembly 13 from moving by injecting a molten thermoplastic resin into the cavity 37. In this state, a molten thermoplastic resin such as a carbon fiber-reinforced thermoplastic polyphenylene sulfide resin is injected into the cavity 37 to form the base member 10 as shown in FIG. 14.

After solidification, the resulting molding is taken out of the cavity 37 by moving the movable mold means 31 upward and by moving the push plate 32b upward by the push rod 41. After cleaning the cavity 37 the next permanent magnet assembly 13 is placed in the cavity 37 to conduct the next injection molding. Incidentally, since an upper end of the return rod 42 abuts the upper mold plate 31a, the push plate 32b is pushed downward when the movable mold means 31 is assembled to the stationary mold means 32, whereby the push pins 40, 40 move to the original position.

Figure 14:
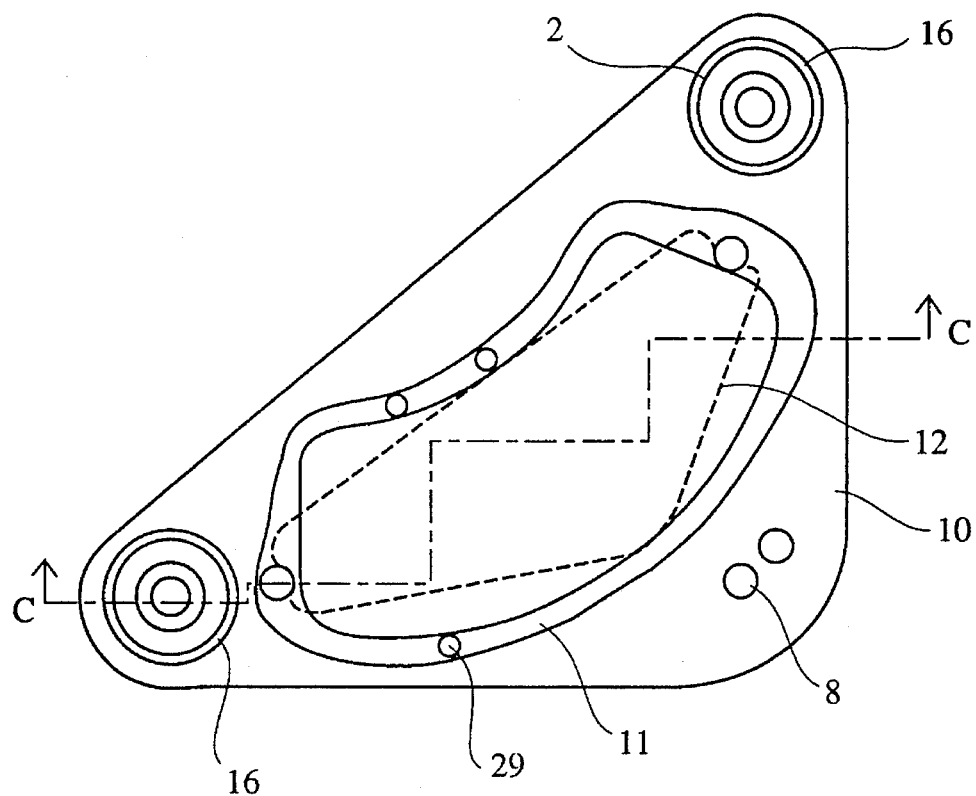
FIG. 14 is a plan view showing the base member in the swing-type actuator according to the ninth embodiment of the present invention.
Figure 15:
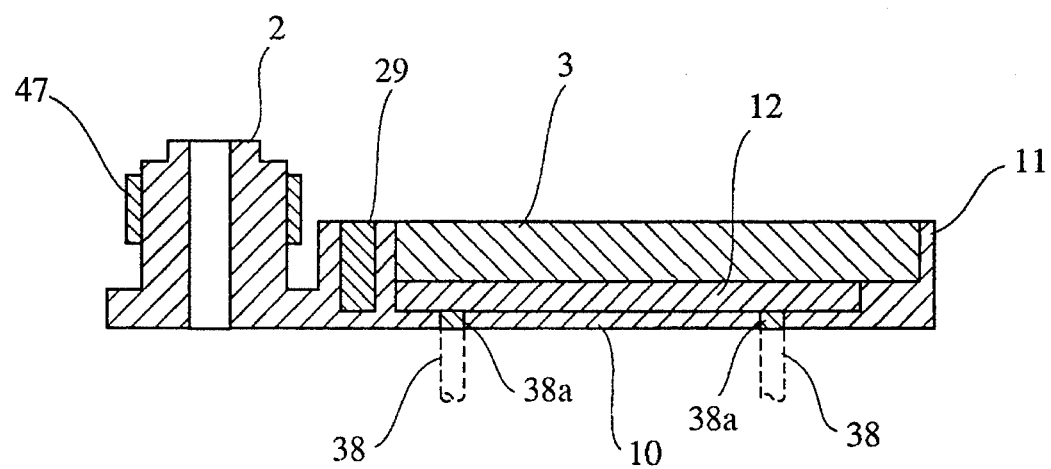
FIG. 15 is an enlarged cross-sectional view taken along the line C—C in FIG. 14.

FIG. 14 shows the base member 10 of this embodiment, and FIG. 15 shows a cross section of the base member 10 taken along the line C—C. In FIGS. 14 and 15, 29, 38a denote holes of the positioning pins 38, 38 and 43 formed in the hold portion 11. When such holes 29, 38a remain in the base member 10, flash may be detached from the base member 10, and dust may be accumulated in the holes. Also, the lower yoke 12 is usually made of a steel material such as soft iron, steel, etc., and a surface treatment such as plating is not conducted to the lower yoke 12 to reduce the production cost thereof. Accordingly, if the lower yoke 12 is exposed to the air, rusting would take place on the lower yoke 12. Therefore, the holes 29, 38a are filled with a thermoplastic resin.

For this purpose, the base member 10 is placed in a cavity of a second mold having a shape corresponding to the support portion 2, and a thermoplastic resin is injected into the cavity to fill the holes 29, 38a with the thermoplastic resin.

Figure 16:
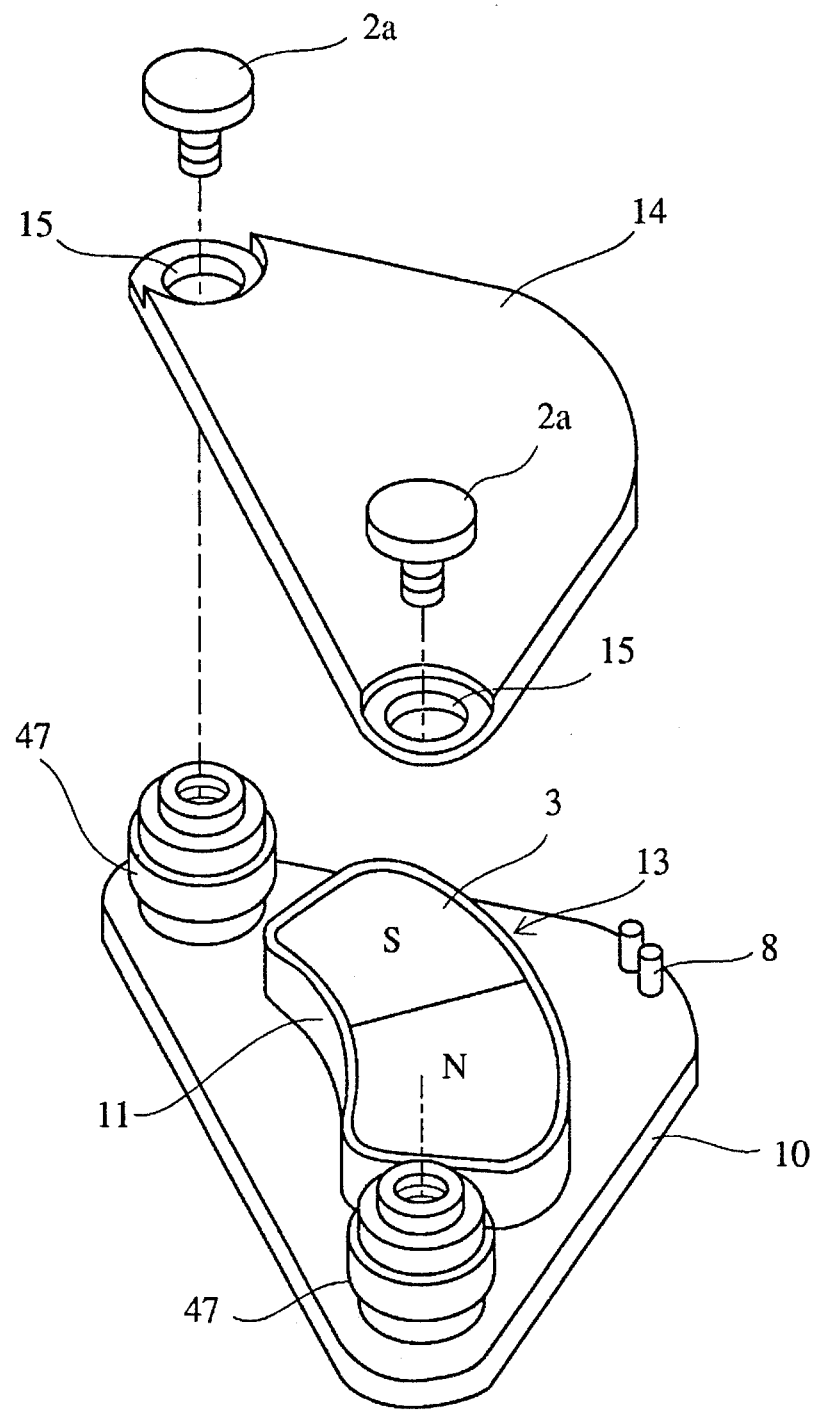
FIG. 16 is an exploded perspective view showing the swing-type actuator of the ninth embodiment of the present invention.

The support portion 2 is also preferably coated with a cushion means 47 made of an elastic resin at least in a portion facing the swingable arm as shown in FIG. 16. The cushion means is conventionally an 0 ring attached to the support portion 2 after completion of the base member 10. However, since the attachment of the O ring is troublesome, the integral formation of the cushion means 47 is preferable.

The cushion means 47 may be made of an elastic resin such as a urethane rubber. The formation of the cushion means 47 may be conducted simultaneously with the filling of the holes 29, 38a.

With respect to the other members and their materials, they may be the same as those in the first embodiment. Therefore, their explanations will be omitted here, and please refer to the section of "[1] First embodiment."

[10] Tenth embodiment

Figure 17:
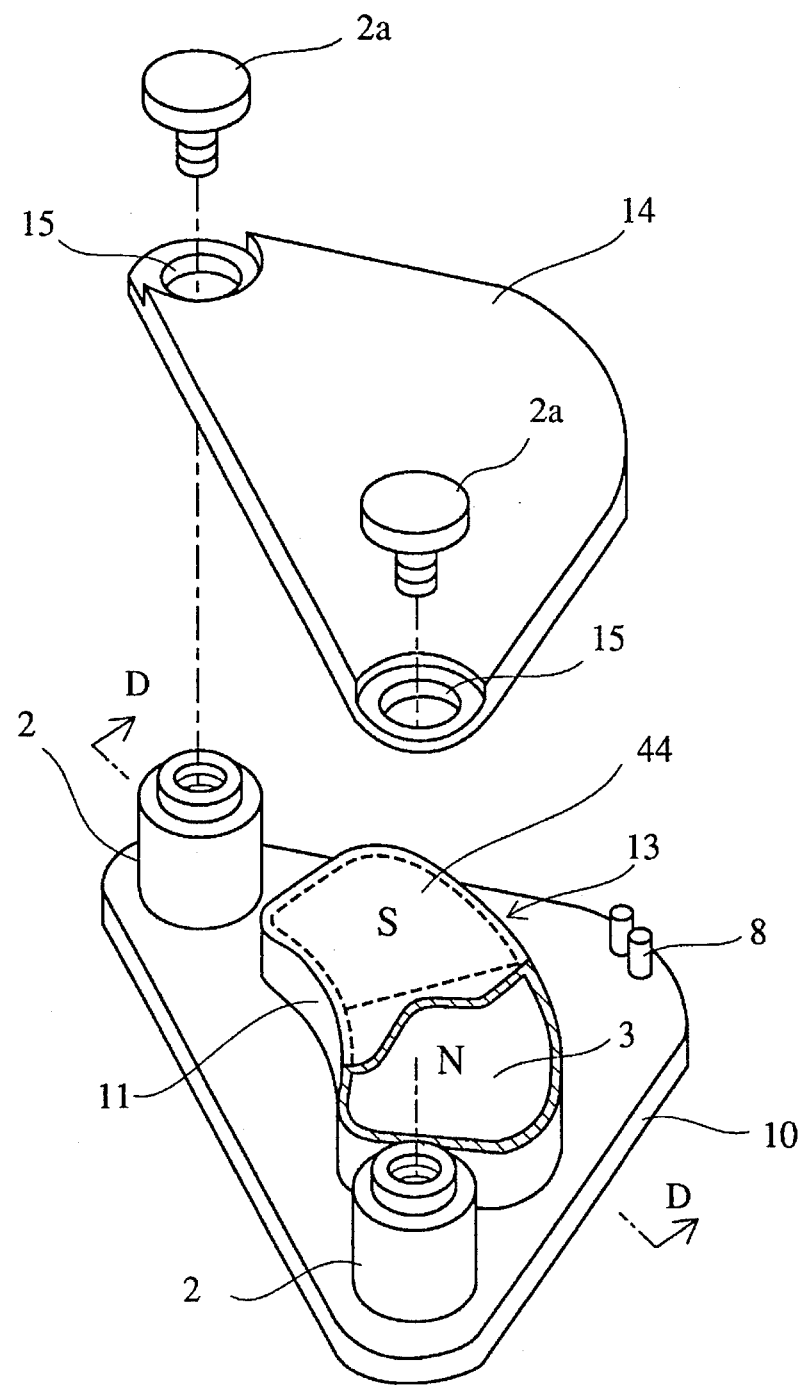
FIG. 17 is an exploded perspective view showing the swing-type actuator according to the tenth embodiment of the present invention.
Figure 18:
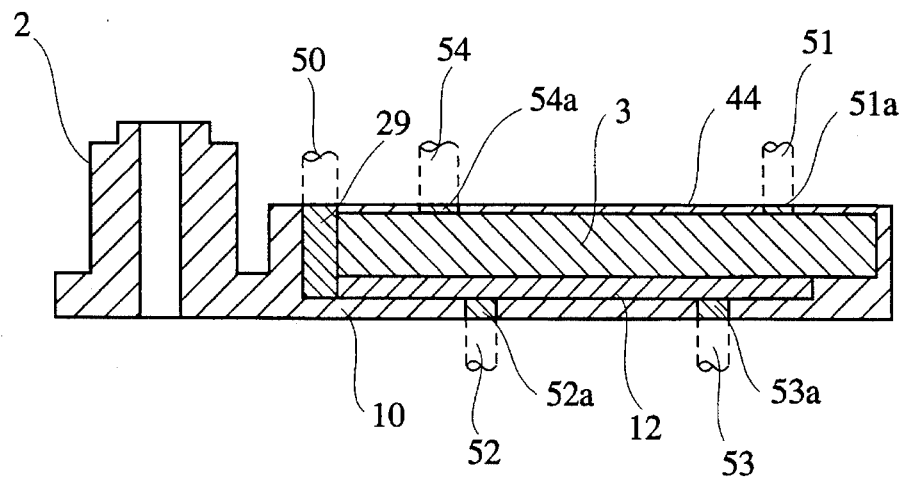
FIG. 18 is a cross-sectional view taken along the line D—D in FIG. 17.

FIGS. 17 and 18 show the swing-type actuator according to the tenth embodiment of the present invention, in which the same reference numerals are assigned to the same parts as those in FIG. 1.

The feature of the tenth embodiment is that the hold portion 11 of the base member 10 integrally has a cover portion 44 which covers the permanent magnet 3.

When the permanent magnet 3 is a sintered magnet of an Nd-Fe-B type permanent magnet, it is easily cracked or broken and is easily oxidizable. To protect the permanent magnet 3, the permanent magnet 3 may be plated with a corrosion-resistant metal. However, such plating treatment is usually costly. Accordingly, it is preferably covered with the cover portion 44 integrally extending from the vertical wall of the hold portion 11.

The cover portion 44 preferably has a thickness of 0.01–0.3 mm. If the thickness of the cover portion 44 is too large, a magnetic flux in the magnetic gap is too small. On the other hand, if the thickness of the cover portion 44 is too small, a sufficient corrosion resistance effect cannot be obtained, the more preferred thickness of the cover portion 44 is 0.05–0.1 mm.

In the production of the base member 10 integral with the permanent magnet assembly 13 by an insert molding method, an injection mold of the same type as shown in FIG. 13 may be used. As shown in FIG. 18, this injection mold comprises positioning pins 50–53 and a push pin 54. Holes formed by these pins may become portions in which flush is formed and dust is accumulated. Therefore, these holes 29, 51a–54a should be filled with a thermoplastic resin.

The swing-type actuator of this embodiment may be produced by substantially the same method as in the ninth embodiment. First, the permanent magnet assembly 13 is placed in the cavity 37, and the accurate positioning of the permanent magnet assembly 13 is conducted by the positioning pins 38. To embed the permanent magnet 3 in the base member 10 completely, positioning pins 51–53 are also used.

Since these positioning pins 50–53 may reach the lower yoke 12 and the permanent magnet 3, the holes 29, 51a–53a are filled with a thermoplastic resin. To fill the thermoplastic resin in the holes 29, the base member 10 may be placed in a second mold to insert the thermoplastic resin into the holes 29.

With respect to the other members and their materials, they may be the same as those in the first embodiment. Therefore, their explanations will be omitted here, and please refer to the section of "[1] First embodiment."

Although the embodiments of the present invention have been explained separately, it should be noted that two or more features as described above may be incorporated into the swing-type actuator of the present invention without deviating from the scope of the present invention.

What is claimed is:

1. A swing-type actuator comprising:

(a) an upper yoke made of a ferromagnetic material;

(b) a permanent magnet assembly constituted by a lower yoke made of a ferromagnetic material and opposing said upper yoke and a flat permanent magnet attached to said lower yoke;

(c) a base member made of a thermoplastic resin and having a hold portion projecting from an upper surface of said base member for defining a space into which said permanent magnet assembly is received and support portions projecting from an upper surface of said base member for fixing said upper yoke such that there is a magnetic gap between said permanent magnet assembly and said upper yoke, said base member being integrally molded together with said permanent magnet assembly such that said permanent magnet assembly is fixed to said base member inside said hold portion; and (d) a swingable arm having one end adapted to receive a movable coil and the other end to which a function member is fixable, said movable coil being swingable in said magnetic gap, wherein each of said support portions is integrally provided at a top thereof with a key portion in the shape of an annular projection having a plurality of vertical slits, said key portion having such a slightly larger outer diameter than an inner diameter of said hole of said upper yoke that the detachment of the key portion from said hole of said upper yoke is prevented.

2. A swing-type actuator comprising:

(a) an upper yoke made of a ferromagnetic material;

(b) a permanent magnet assembly constituted by a lower yoke made of a ferromagnetic material and opposing said upper yoke and a flat permanent magnet attached to said lower yoke;

(c) a base member made of a thermoplastic resin and having a hold portion projecting from an upper surface of said base member for defining a space into which said permanent magnet assembly is received and support portions projecting from an upper surface of said base member for fixing said upper yoke such that there is a magnetic gap between said permanent magnet assembly and said upper yoke, said base member being integrally molded together with said permanent magnet assembly such that said permanent magnet assembly is fixed to said base member inside said hold portion;

(d) a swingable arm having one end adapted to receive a movable coil and the other end to which a function member is fixable, said movable coil being swingable in said magnetic gap; and (e) an auxiliary yoke made of a ferromagnetic material and embedded in each of said support portions, said auxiliary yoke being magnetically connected to said lower yoke extending in said base member.

3. The swing-type actuator according to claim 2, wherein said auxiliary yoke further comprises:

a part of said lower yoke that is press-deformed.

4. A swing-type actuator comprising:

(a) an upper yoke made of a ferromagnetic material;

(b) a permanent magnet assembly constituted by a lower yoke made of a ferromagnetic material and opposing said upper yoke and a flat permanent magnet attached to said lower yoke;

(c) a base member made of a thermoplastic resin and having a hold portion projecting from an upper surface of said base member for defining a space into which said permanent magnet assembly is received and support portions projecting from an upper surface of said base member for fixing said upper yoke such that there is a magnetic gap between said permanent magnet assembly and said upper yoke, said base member being integrally molded together with said permanent magnet assembly such that said permanent magnet assembly is fixed to said base member inside said hold portion; and (d) a swingable arm having one end adapted to receive a movable coil and the other end to which a function member is fixable, said movable coil being swingable in said magnetic gap, wherein said hold portion of said base member has holes formed by positioning pins of an injection mold in the process of insert injection, said holes of said hold portion being filled with a thermoplastic resin, wherein each of said support portions includes a cushion of elastic resin coating at least a portion thereof facing said swingable arm.

5. A swing-type actuator comprising:

(a) an upper yoke;

a permanent magnet assembly combining a permanent magnet with a lower yoke;

(c) a base member of thermoplastic resin encasing the permanent magnet assembly;

(d) support portions projecting from the base member and attachable to the upper yoke to align the upper yoke with the permanent magnet assembly and define a magnetic gap therebetween;

(e) a swingable arm having a movable coil at one end and a function member at the other, the magnetic coil swingable in the magnetic gap; and (f) an auxiliary yoke positioned in each support portion and magnetically connected to the lower yoke.

6. The swing-type actuator of claim 2, wherein the auxiliary yoke further comprises:

a part of the lower yoke that is press-deformed.

7. A swing-type actuator comprising:

(a) an upper yoke;

(b) a permanent magnet assembly combining a permanent magnet with a lower yoke;

(c) a base member of thermoplastic resin having an upper surface;

(d) a hold portion integrally molded to the upper surface of the base member and encasing the permanent magnet assembly, said hold portion defining holes therein formed by positioning pins from an injection mold, said holes filled with thermoplastic resin;

(e) support portions projecting from the base member and attachable to the upper yoke to align the yoke with the permanent magnet assembly and define a magnetic gap therebetween;

(f) a swingable arm having a movable coil at one end and a function member at the other, the magnetic coil swingable in the magnetic gap; and (g) a cushion disposed on at least a portion of each support portion facing the swingable arm.

* * * * *